United States Patent [19]

Guennou et al.

[11] 4,090,195
[45] May 16, 1978

[54] ANTI-BURGLAR MINI-RADAR

[75] Inventors: Serge Guennou, Croissy; Raymond Maugis, Garges-les-Gonesse, both of France

[73] Assignee: U.S. Philips Corporation, New York, N.Y.

[21] Appl. No.: 670,912

[22] Filed: Mar. 26, 1976

[30] Foreign Application Priority Data

Mar. 26, 1975 France .............................. 75 09446

[51] Int. Cl.$^2$ ............................................. G01S 9/02
[52] U.S. Cl. .............................. 343/5 PD; 343/7 AG
[58] Field of Search .......................... 343/5 PD, 7 AG

[56] References Cited

U.S. PATENT DOCUMENTS

| 3,270,339 | 8/1966 | McEuen | 343/5 PD X |
| 3,383,678 | 5/1968 | Palmer | 343/5 PD |
| 3,680,074 | 7/1972 | Lieser | 343/5 PD X |
| 3,727,216 | 4/1973 | Antonio | 343/5 PD |
| 3,859,656 | 1/1975 | Klein et al. | 343/5 PD |
| 4,003,045 | 1/1977 | Stockdale | 343/5 PD X |

Primary Examiner—T.H. Tubbesing
Attorney, Agent, or Firm—Frank R. Trifari

[57] ABSTRACT

An anti-interference Doppler effect mini-radar includes a generator of pure microwaves, and a receiver for receiving reflected microwaves and coupled to the generator for detecting and demodulating the transmitted and reflected microwave signals. The demodulated signals are applied to a gain controlled preamplifier, and thence to an adjustable gain amplifier. The output of the adjustable gain amplifier is applied to an alarm control circuit. In order to adjust the gain of the preamplifier a servo-circuit is responsive to the input of the alarm control circuit for applying a gain control voltage to the gain control terminal of the preamplifier. A timing circuit responsive to the output of the adjustable gain amplifier blocks the servo-circuit and inhibits the operation of the alarm control circuit for a determined time following the sudden increase in the output of the adjustable gain amplifier.

9 Claims, 4 Drawing Figures

ANTI-BURGLAR MINI-RADAR

The present invention relates to an anti-intruder mini-radar with Doppler effect, including a generator of a pure electromagnetic microwave. The mini-radar further comprises a self-oscillating and self-relaxing semiconductor diode, means to feed the said generator (and auxiliary circuits) provided with "power on" pilots, a detector and demodulator microwave diode coupled to the wave transmitted by the miniradar and to the waves reflected towards the said mini-radar, means to amplify and use the Doppler frequency shift signals resulting from the demodulation of the waves reflected by objects and bodies in motion, and in some cases a circuit for autocontrol of the proper operation of the microwave elements of the mini-radar under consideration.

It is well known that there are many variations of devices designed to detect the presence of interferences (e.g. burglars) in a specific area under the supervision of an anti-intrusion device, said devices being generally based on the reflection of the waves transmitted by a local generator. The waves are subsequently picked up by a receiver often located close to the generator, with the nature of the transmitted waves varying from supersonic waves to electromagnetic microwaves.

In order for these devices to only initiate the operation of the alarm system upon the occurrence of a monitored interference, it is important that the utilized devices are not affected by the presence or the reception of permanent (or semipermanent) signals of a more or less fluctuating intensity and having the character of background noise. Such background noise, depending on the utilized device, may result from sonic or ultrasonic parasitic waves or from an amplitude modulation, in phase or in frequency, of a microwave.

In order to take such disturbing effects into account, it has previously been proposed, in the French patent No. 2,069,471, to automatically adjust the release threshold of an alarm in relation to the level of background noise so as to prevent the said background noise from inducing false alarms.

This process, while satisfactory in principle, runs into difficulties when applied since the release threshold can only be adjusted within a very narrow value range in relation to the magnitude of the supply voltage of the utilized electronic circuits. It is indeed difficult to exceed one half of the supply voltage as a maximum level, and it is generally very delicate and uncertain to use a minimum threshold of less than one-tenth of the supply voltage when taking into account the fairly low stabilized supply voltages (e.g. 8 to 9 volts) which are desirably used in conventional transistorized circuits, as well as the Vbe-voltage of the silicon transistors (about 0.7 volt).

An object of the invention, among other things, is to remedy this drawback and to enable the manufacturing of anti-intruder mini-radars which will automatically operate at the maximum detection sensitivity permitted by the level of background noise resulting from various causes and affecting the said mini-radars under the conditions prevailing at the time of their utilization.

Another object of the invention is to enable the manufacture of mini-radars which, by relatively simple means, will check the permanence of a significant signal before releasing an alarm.

The invention takes into consideration that the adaptation of the detection conditions of the anti-intruder mini-radars with Doppler effect can be made in a much wider, more flexible and more secure manner by regulating the gain of an amplifier rather than by adjusting the release threshold of an alarm control circuit.

According to the invention, an anti-interference mini-radar with Doppler effect, comprises, in particular, an electromagnetic microwave generator for generating a pure microwave, including a self-oscillating or self-relaxing semiconductor diode, means to feed the said generator (and the auxiliary circuits) provided with "power on" pilots, a detector and demodulator microwave diode coupled to the wave transmitted by the mini-radar and to the waves reflected towards the said mini-radar, means to amplify and use the Doppler frequency shift signals resulting from the demodulation of the waves reflected by objects or bodies in motion, and may also include a circuit for autocontrol of the proper operation of the microwave elements of the mini-radar under consideration. The invention is characterized in that it includes a combination of means consisting of an adjustable high gain low-frequency amplifier (of which the output is connected to the signal input of an alarm control circuit) preceded by an automatic gain controlled input preamplifier stage, a timed detection system (i.e. timing circuit) of which the input is connected to the output of the adjustable high gain low-frequency amplifier and of which two outputs are respectively connected to a momentary inhibition input of the alarm control circuit and to a blocking input of a servo-circuit with a high time constant. The servo circuit is provided with a signal input connected to the input of the alarm control circuit and an output terminal connected to a gain control terminal of the automatic gain controlled input preamplifier stage.

Through the medium of the servo-circuit with a high time constant, an anti-intruder mini-radar according to the invention will automatically adapt its sensitivity in relation to the slow variation of the background noise level liable to develop in terms of the time and the usage conditions, so as to operate at all times with the highest possible sensitivity.

The combination formed by the timed detection device cooperating with the blocking input of the servo-circuit and with the inhibit input of the alarm control circuit will prevent an anti-intruder mini-radar according to the invention from releasing an inopportune alarm when it detects a transient signal, such as that resulting from the passage of a fly or butterfly in the microwave beam at a short distance from the device. When a signal has, at least for a very brief time, an amplitude that could originate from a signal caused by a burglar, the device, after a time period that is adjustable in relation to the requirements of the user, will check for the presence of a significant signal and will release the alarm when the presence of the said signal is confirmed.

It should be noted that during the above-mentioned time period, the gain of the automatic gain controlled input preamplifier is maintained at the value it had, in relation to the background noise, before the detection of a signal that could correspond to an intruder.

In so doing, a maximum sensitivity is preserved for the mini-radar according to the invention while avoiding the frequent drawback of very sensitive devices, namely, the proliferation of false alarms.

According to an advantageous embodiment of mini-radars according to the invention, the connection between the output of the adjustable high gain low-frequency amplifier and the signal input of the alarm control circuit consists of a rejection filter tuned to a frequency which is double the frequency of the alternating current supply voltage at the site where the mini-radar is used.

This modification allows a mini-radar according to the invention to be insensitive to disturbances resulting from the presence of an operating fluorescent tube in the lobe of the electromagnetic wave beamed by the mini-radar.

The following description when read with reference to the attached drawings, given by way of a non-limiting example, will provide a clearer understanding of what the invention represents and how it can be embodied.

Figure 1:
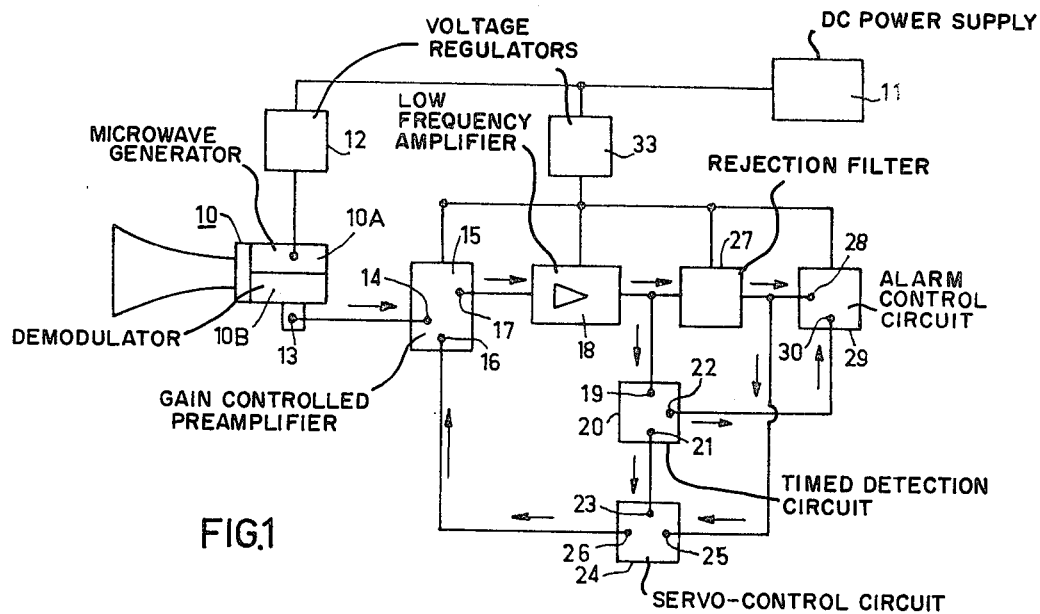
FIG. 1 is a block diagram of an anti-intruder radar according to the invention.

In FIG. 1 the microwave part of the anti-intruder mini-radar with Doppler effect according to the invention is referenced by the numeral 10 and consists of two adjoining sections: a section 10A for generating the electromagnetic microwave energy and transmitting the beam, and a section 10B, coupled to the transmitted wave and to the received reflected wave comprising, in particular, a detector and demodulator microwave diode and a load resistor cooperating with the said diode.

The electric power supply of the section 10A comprises a non-stabilized direct current voltage source 11 and a circuit 12 for the adjustment and stabilization of the supply voltage of the microwave oscillator of the section 10A.

An output terminal 13 of the section 10B is connected to an input terminal 14 of an automatic gain controlled preamplifier 15 which amplifies the Doppler frequency signals appearing at the terminal 13. The preamplifier 15 is provided with a gain control terminal 16. The output terminal 17 of the preamplifier is connected to the input of a low-frequency amplifier 18 which has an adjustable high gain (e.g. adjustable between $5 \times 10^2$ and $5 \times 10^4$).

The output of the amplifier 18 is connected to the input terminal 19 of a timed detection circuit 20 which has two output terminals 21 and 22. The output terminal 21 is connected to a blocking (inhibit) terminal 23 of a servo-circuit 24. The servo-circuit 24 has a signal input terminal 25, and an output terminal 26 connected to the gain control terminal 16 of the preamplifier 15.

The output of the amplifier 18 is also connected to the input of a rejection filter 27 tuned to a frequency which is double the frequency of the A.C. supply source at the site where the radar is used. The output of the filter is connected to a signal input terminal 28 of an alarm control circuit 29. The release inhibiting terminal 30 of the circuit 29 is connected to the output terminal 22 of the timed detection device 20.

The output terminal 13 of the section 10B of the microwave device 10 could also be connected to the input of a circuit for autocontrol of the proper operation of the microwave elements of the radar (not shown). The alarm control circuit, in its simplest may consist of an AND gate circuit having an alarm device connected to the output of the AND gate. One input of the AND gate is coupled via signal input terminal 28 to the output of the rejection filter, while a second input thereof is coupled via inhibit terminal 30 to the output terminal 22 of the timed detection circuit. The inhibit signal applied to terminal 30 thus controls the passage of the filtered doppler signal supplied to terminal 28 of the alarm control circuit. U.S. Pat. No. 2,841,783 shows one such device and others are shown in "Digital Computer And Control Engineering" by Robert S. Ledley, McGraw-Hill Book Co., 1960, for example at pages 311 and 312.

The various low-frequency circuits of the radar i.e. the preamplifier 15, the low-frequency amplifier 18, the timed detection circuit 20, the servo-circuit 24, the rejection filter 27 and the alarm control circuit 29, are energized by the aforementioned direct current source 11 through the medium of a voltage stabilizing circuit 33.

The operation of the anti-intruder mini-radar with Doppler effect shown in FIG. 1 can be explained as follows: the section 10A of the microwave part of the mini-radar consists, e.g. of a Gunn effect diode generator fed through the medium of the stabilizer circuit 12 at a voltage designated by the manufacturer of said generator.

The section 10B of the microwave part consists of a detector and demodulator microwave diode (e.g. a Schottky diode) coupled to the pure electromagnetic wave produced by the above-mentioned generator, and to the waves reflected towards the radar, and it ensures a detection of the envelope of the transmitted microwave signal with stable frequency. The detection of the microwaves produces a direct current voltage occurring at the terminals of the detection resistance associated with the microwave diode.

The demodulation of the waves reflected towards the radar by the objects in motion results in the appearance of a small alternating current component with Doppler frequency, i.e. with a low frequency, which is superposed on the detected D.C. voltage component mentioned in the preceding paragraph.

The A.C. voltage component with Doppler frequency is applied by a capacitive coupling to the input 14 of the preamplifier 15. The terminal 13 also could be coupled to an input of the autocontrol circuit the circuit of the type described in the French patent No. 2,284,938. As explained in that patent, an autocontrol circuit controls the proper operation of the radar and the intervenes when the value of the D.C. component of the detected voltage drops below a certain level, and also when the value of the D.C. component or the peak value of the sum (D.C. component +A.C. component) exceeds a certain level.

The operating conditions of the automatic gain preamplifier 15 are controlled by the servo-circuit 24 as described below.

The Doppler frequency signal is amplified by the amplifier 18 and is applied to the timed detection circuit 20, as well as to the input of filter 27 which transmits the filtered signal to the alarm control circuit 29. When the level of the low-frequency signal applied to the input of the preamplifier 15 varies slowly (e.g. slow fluctuations of the background noise), the servo-circuit 24 adjusts the gain of the preamplifier stage 15 in such a manner that a simple increase in background noise will not induce the release of an alarm, for example, and it will increase the gain of the said preamplifier stage 15 when the background noise decreases (e.g. as a result of a decrease in the level of the transmitted microwave). The sensitivity of the radar will thus be better preserved in case of moderate aging of the Gunn effect diode.

The timed detection circuit 20 has an action threshold corresponding to a non-filtered amplified signal amplitude of about 2.5 volts peak to peak, which corresponds to a filtered signal of 2 volts peak to peak, for example, at the output of filter 27.

The action threshold of the alarm control circuit 29 is adjusted to 3 volts peak to peak, for example, by which a definite shift is introduced between the intervention of the timed detection circuit and that of the alarm control circuit.

When the low-frequency signal level applied to the input of the preamplifier 15 suddenly increases, the sensitivity of the preamplifier is not instantaneously readjusted and, when the non-filtered amplifier signal reaches an amplitude equal to or higher than 2.5 volts peak to peak (according to the given example) the timed detection circuit intervenes immediately by blocking, on the one hand, the operation of the gain control servo-circuit 24 so as not to reduce the gain of the preamplifier stage 15 during the desired timing period (e.g. adjustable between 0.3 second and 1 second), while on the other hand inhibiting the release of the alarm by the circuit 29 of the alarm control.

When, at the end of the time period corresponding to the timing period of the circuit 20, the filtered signal present at the input of the alarm control circuit 29 is equal to or higher than 3 volts peak to peak, the anti-interference mini-radar will release the alarm system.

When at the end of the above-mentioned time period the filtered signal is lower than the above-indicated level of release and has no significant amplitude anymore, it means that the momentary rise of its level was accidental (such as the "reception" of a parasite or the passage of a fly in the vicinity of the mini-radar antenna), and there will be no release of an alarm, which would actually have been a false alarm.

This combination of means according to the invention thus enables the preservation, in the mini-radar, of a maximum sensitivity which can be prevailed upon under the usage conditions of the device, and more particularly in relation to the background noise of which the total level is liable to vary but slowly. The participation of the mini-radar itself in the background noise level is generally negligible as Gunn diode microwave sources transmit a sufficiently pure signal, and the Schottky diodes when used under favorable conditions will not become noisy. However, devices whose operation is often accompanied by vibrations (e.g. air-conditioners) or the rotation of metallic surfaces (e.g. fan blades), will cause the occurrence of semi-permanent pseudo Doppler signals and produce a signal with the characteristic of background noise.

The applicant moreover noted that lighted fluorescent tubes located in the field of the radar brought about the occurrence of a pseudo Doppler signal, of a frequency double the frequency of the A.C. feeding the said fluorescent tubes. Indeed, twice per period, the ionized plasma formed by the gas and/or vapor mixture filling the tube and serving as "support" for the discharge became sufficiently conductive to act as a reflector which repetitively appeared and disappeared.

In order to prevent this phenomenon from adversely disturbing the operation of radars according to the invention, the applicant provided a rejection filter 27 tuned to a frequency double that of the local AC supply and connected between the output of the amplifier 18 and the input of the alarm control device 29. The input terminal 25 of the servo-circuit is connected to the output of the rejection filter 27.

Figure 2:
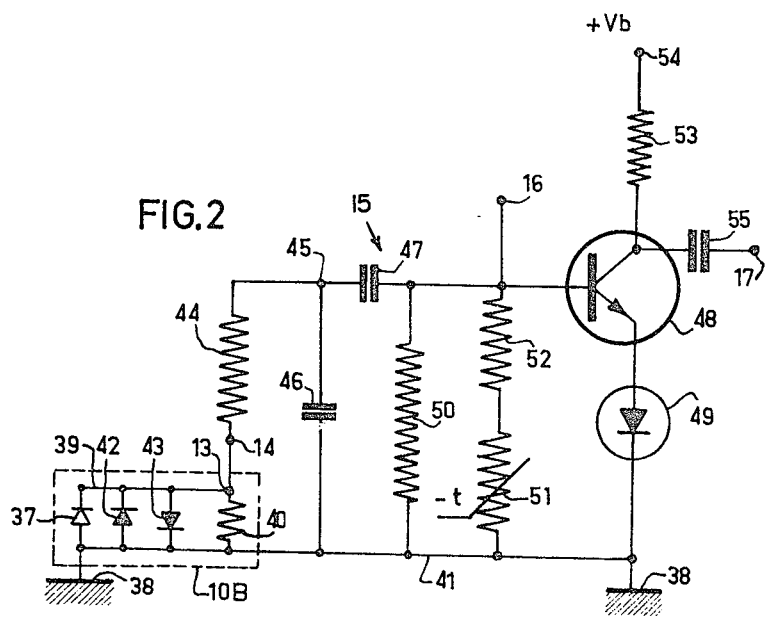
FIG. 2 is a circuit diagram of the "demodulation" part and the "preamplifier" part of the anti-intruder radar of FIG. 1.

In FIG. 2, within a rectangle drawn in broken lines are represented the components corresponding to the microwave section 10B which provides the demodulation of the received waves reflected in the direction of the mini-radar. The components include a Schottky diode 37 of which the anode is directly connected to a ground 38 formed by the ground of the microwave part 10 and the electronic circuits associated therewith. The cathode of the Schottky diode 37 is connected to an insulated conductor 39 ending at the terminal 13, to which is connected the top of a detector resistance 40. The bottom of resistance 40 is connected to the ground 38 through the medium of a ground conductor 41. Two silicon junction diodes 42 and 43 are arranged in anti-parallel assembly between the ground conductor 41 and the conductor 39. The diode 42 has its anode connected to the ground 38 and the diode 43 has its cathode connected to the said ground. The two diodes 42 and 43, in a well-known manner, ensure an automatic limitation of the direct or inverse voltages which are liable to occur between the electrodes of the Schottky diode 37.

The terminal 13 is directly connected to the terminal 14 which forms the input of the preamplifier 15. The terminal 13 could also be connected to the impact of an autocontrol circuit for the proper operation of the microwave elements of the radar. A resistance 44 is inserted between the terminal 14 and a point 45, slightly decoupled in relation to the ground by a capacitor 46. A fixed coupling capacitor 47 is arranged between the point 45 and the base of an NPN transistor 48, the emitter of which is connected to the anode of a semiconductor diode 49 having its cathode connected to the ground 38.

Between the base of the NPN transistor 48 and the ground connection 41 are arranged a fixed resistor 50, and, in parallel therewith, a resistor 51 with a negative temperature coefficient connected in series with a fixed resistor 52. The collector of the NPN transistor 48 is fed through a load resistor 53 from a point 54 connected to the positive pole of the voltage stabilizer circuit 33, of which the negative pole is connected to the ground 38. The point 54 is brought to a D.C. voltage +Vb in relation to the ground and the collector of the NPN transistor 48 is coupled to the output terminal 17 by a fixed capacitor 55.

The gain control terminal 16 is connected to the base of the NPN transistor 48, and receives an appropriate preamplifier stage gain control current originating from the servo-circuit 24 with a high time constant.

By way of example, we should point out that a circuit such as that shown in FIG. 2, made with the components of which the types or characteristics are listed below, has operated satisfactorily.

37 = Schottky diode BAW 95 Ω
40 = 560 Ω
42 = BAX 13
43 = BAX 13 or BZX 75/C 1V4
44 = 1000 Ω
46 = 0.1 μF
47 = 6.8 μF
48 = BC 549 C
49 = BAX 14
50 = 56 k Ω

51 = 100 k Ω
52 = 33 k Ω
53 = 1500 Ω
55 = 0.22 μF
+ Vb = + 8 volts

Figure 3:
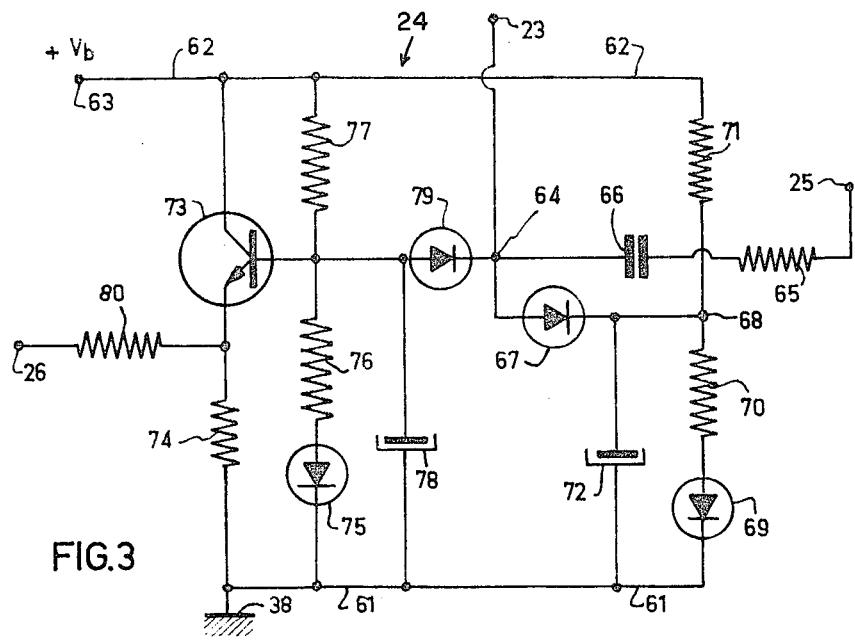
FIG. 3 is a circuit diagram of a servo-circuit for controlling the gain of the preamplifier shown in FIG. 2.

The servo-circuit 24 which provides the gain control with a high time constant, shown in FIG. 3, includes four semiconductor diodes and an NPN transistor. This circuit is fed and/or polarized from a negative conductor 61 connected to the ground 38 of the device, and from a positive conductor 62 ending at a terminal 63 connected to the positive pole of the stabilizer circuit 33 of FIG. 1, which brings the terminal 63 to a voltage +Vb in relation to ground.

The filtered signal input terminal 25 is coupled to a point 64 of the circuit through the medium of a resistor 65 and a capacitor 66 connected in series. A semiconductor diode 67, of which the anode is connected to the point 64, is arranged between the aforementioned point 64 and a point 68 on a voltage divider connected between the negative conductor 61 and the positive conductor 62. Starting from the conductor 61, this voltage divider consists of a semiconductor diode 69, of which the cathode is connected to the conductor 61, a resistor 70 ending at the point 68 and a resistor 71 between the point 68 and the conductor 62. An electrolytic capacitor 72 is arranged between the point 68 and the ground connection 61.

The collector of an NPN transistor 73 is directly connected to the positive conductor 62 and a load resistor 74 is arranged between the emitter of the said transistor and the ground connection 61. The base of the transistor 73 is biased by a voltage divider comprising, on the ground side, a diode 75 connected in a positive direction (direct sense) and a resistor 76, whereas a resistor 77 is arranged between the base of the said transistor and the positive conductor 62. An electrolytic capacitor 78 having a high capacitance value is connected between the ground and the base of the transistor 73. A semiconductor diode 79, of which the cathode is connected to the point 64, is arranged between the said point and the base of the transistor 73.

The blocking terminal 23 of the servo-cricuit is directly connected to the aforementioned point 64.

The operation of the servo-circuit shown in FIG. 3 can be explained as follows: while the amplified and filtered Doppler signal is applied to the input terminal 25 of said circuit; the semiconductor diodes 67 and 79 detect and rectify respectively the positive alternations and the negative alternations of the signal applied to the terminal 25.

In the absence of a signal at the terminal 25, the NPN transistor 73 has an operating point and a voltage at its emitter in relation to ground which are determined by the semiconductor diode 75, the resistor 76 and the resistor 77 constituting the voltage divider biasing the base of this transistor, as well as by the Vbe of the said transistor. This operating point is set so that the preamplifier 15 is at its maximum gain, taking into account that the base of the NPN transistor 48 of the said preamplifier is coupled to the emitter of the NPN transistor 73 by means of the resistor 80.

The detection by the diode 79 of the negative alternations of the signal applied to the terminal 25 brings about a lowering of the potential at the base of the transistor 73 which thus becomes less positive. The potential of the emitter of the transistor 73 decreases as well, and brings about a decrease in the gain of the preamplifier 15, from which follows the overall effect of automatic gain control of the "servo-circuit - preamplifier circuit" combination.

When a positive voltage of e.g. 7.5 volts is applied to the blocking terminal 23, it interrupts the detection of the negative alternations of the filtered signal by the semiconductor diode 79 and, because of the high value of the capacitor 78, the NPN transistor 73 will, during the one second period following the application of the blocking voltage for example, practically keep the operating point it had at the moment of application of the said blocking voltage.

By way of example, we should point out that a servo/circuit 24 such as that shown in FIG. 3, made with components of which the types or characteristics are listed below, has operated satisfactorily 65 = 27 k Ω
66 = 1.5 μF
67 = BAX 13
69 = BAX 13
70 = 100 k Ω
+ Vb = 8 volts
71 = 150 k Ω
72 = 22 μF
73 = BC 408B
74 = 10 k Ω
75 = BAX 14
76 = 220 k Ω
77 = 330 k Ω
78 = 430 μF
79 = BAX 13
80 = 39 k Ω

Figure 4:
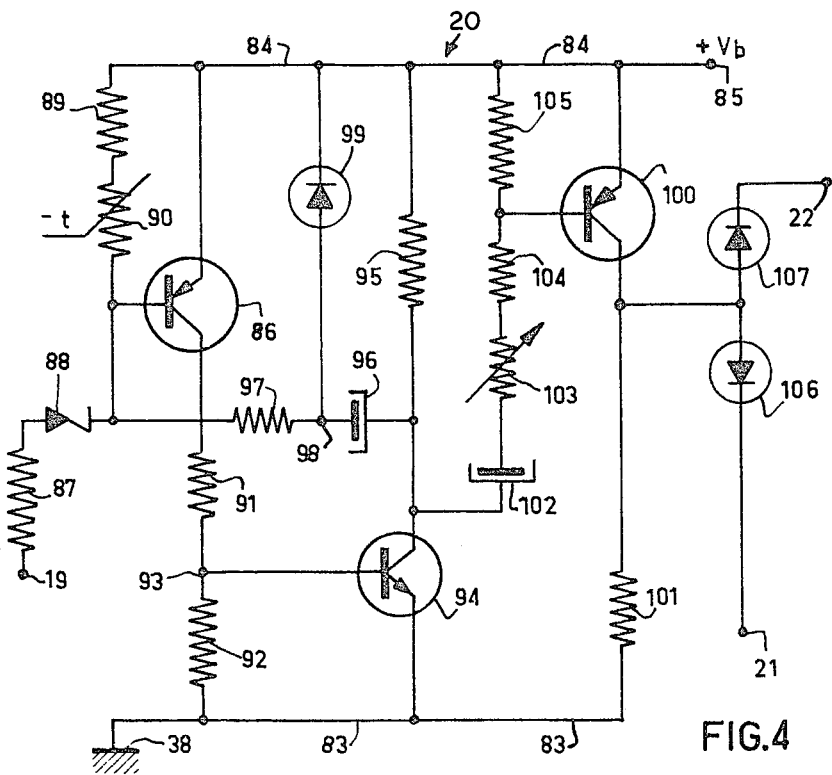
FIG. 4 is a circuit diagram of a timed detection device cooperating with the servo-circuit shown in FIG. 3.

The timed detection circuit shown in FIG. 4 includes two PNP transistors 86 and 100, an NPN transistor 94, three semiconductor rectifier diodes 99, 106 and 107, as well as a Zener diode 88. The supply of the various circuit elements is derived from a negative conductor 83 connected to the ground 38 of the device and from a positive conductor 84 ending at a terminal 85 connected to a positive pole of the stabilizer circuit 33 of FIG. 1, which brings the terminal 85 to a voltage +Vb in relation to the ground.

The signal input terminal 19 is coupled to the base of the PNP transistor 86 by a resistor 87 and a Zener diode 88 connected in series, the cathode of the Zener diode 88 being oriented in the direction of the base of the transistor 86. The emitter of the transistor 86 is directly connected to the positive conductor 84. A fixed resistor 89 and a resistor 90 with a negative temperature coefficient, connected in series, are arranged between the emitter and the base of the transistor 86. Two resistors 91 and 92, connected in series, on both sides of a common point 93, ending respectively at the collector of the transistor 86 and the negative conductor 83, are inserted in the circuit of the collector of the transistor 86. The point 93 is connected to the base of the NPN transistor 94, of which the emitter is connected to the negative conductor 83 and of which the collector is fed from the positive conductor 84 through a load resistor 95.

The collector of the transistor 94 is coupled to the base circuit of the transistor 86 by an electrolytic capacitor 96 and by a resistor 97, connected in series, on both sides of a point 98, the negative pole of the capacitor 96 being connected to the collector of the transistor 94, whereas the other end of the resistor 97 is connected to the base of the transistor 86. The anode of the semiconductor diode 99 is connected to the point 98, and the cathode of the said diode is connected to the positive conductor 84.

The emitter of the PNP transistor 100 is connected to the positive conductor 84 and the collector of said transistor is fed from the negative conductor 83 through a load resistor 101. The base of the transistor 100 is coupled to the collector of the transistor 94 by a circuit comprising, from the collector of the transistor 94 via an electrolytic capacitor 102, an adjustable resistor 103 and a fixed resistor 104 in series. The base of transistor 100 is coupled by a resistor 105 to the positive conductor 84.

The anodes of the two semiconductor diodes 106 and 107 are directly connected to the collector of the transistor 100 and the corresponding cathodes are respectively connected to the output terminal 21 and the output terminal 22.

The operation of the timed detection circuit shown in FIG. 4 can be explained as follows: the input terminal of the filter 27, which is an active filter of well-known design, comprising an NPN transistor connected as an emitter follower, is brought to a mean D.C. potential of +4 volts in relation to the ground, when the supply voltage +Vb is 8 volts, and this potential is applied to the input terminal 19 of the timed detection circuit. As a result, the anode of the Zener diode 88, of which the cathode returns to the positive conductor 84 through the medium of the resistors 89 and 90, will thus receive a polarization of −4 volts on which the non-filtered amplified Doppler signal is superposed. When this signal reaches an amplitude of about 2.5 volts peak to peak, the negative peaks of the said signal are coupled through the Zener diode 88 and induce conduction in the transistor 86. The voltage drop caused by the passage of the collector current on the transistor 86 in the load resistor 92 brings about, in turn, conduction the transistor 94, of so that its collector potential then comes very close to that of the negative conductor 83. This brings about the loading of the electrolytic capacitor 96 through the circuit branch comprising the resistors 89, 90 and 97.

The voltage drop resulting from the passage of the load current of the capacitor 96 through the resistors 89 and 90 keeps the transistor 86 in a conductive state for a suitably selected period of time (equal to two seconds, for example) even if the signal which brought about the start of the conduction of the said transistor was a signal of a short duration and with the characteristic of a parasitic signal.

During that time, the transistor 94 is also conducting which brings about the loading of the electrolytic capacitor 102 through the resistors 103, 104 and 105, connected in series. The characteristics of the components 102, 103, 104 and 105 are selected so that the maximum load time of the capacitor 102 is about one half of the load time of the capacitor 96, and the duration of this load time can be adjusted between 0.3 second and 1 second, e.g., by means of the adjustable resistor 103.

The voltage drop resulting from the passage of the load current of the capacitor 102 through the resistor 105 brings about the conduction of the transistor 100, and as a consequence thereof, it renders positive the anodes of the diodes 106 and 107 of which the voltage, in relation to the ground 38, passes from zero volt to about 7.5 volts during the timing period of the circuit.

As previously explained, the application of a positive voltage to the output terminals 21 and 22 results, on the one hand, in blocking the operation of the gain servo-circuit 24 for a corresponding time thereby maintaining the gain of the preamplifier 15 at its initial value and, on the other hand, in inhibiting the release of an alarm that would risk being a false alarm.

At the end of the selected timing period, the alarm will be released if a filtered amplified Doppler signal of significant amplitude is still present at the input 28 of the alarm control circuit 29.

By way of example, we should point out that a timed detection circuit as shown in FIG. 4, made with components of which the types or characteristics are listed below, operated satisfactorily 86 = BC 418 B
87 = 12 k Ω
88 = BZX79/05V6
89 = 22 k Ω
90 = 6.8 k Ω
91 = 10 k Ω
92 = 33 k Ω
94 = BC 408 B
95 = 10 k Ω
96 = 22 μF
97 = 47 k Ω
99 = BAX 13
100 = BC 418 B
101 = 10 k Ω
102 = 10 μF
103 = 50 k Ω
104 = 5.6 k Ω
105 = 33 k Ω
+ Vb = + 8 volts By way of information, it should also be pointed out that the automatic gain control preamplifier stage 15 is identical in its structure and operation with the variable gain input stage 1 described in the French patent No. 1.566,248, applied for an Jan. 12, 1968.

We claim:

1. In an anti-intrusion Doppler effect mini-radar comprising means for generating and transmitting a pure microwave signal, means for detecting and demodulating microwave energy and coupled to receive the microwave energy transmitted by the mini-radar and to receive the microwave energy reflected towards the mini-radar, means for amplifying the Doppler frequency shift signals at the output of said detecting and demodulating means resulting from the demodulation of microwaves reflected from objects in motion, an alarm control circuit connected to receive the amplified Doppler frequency shift signals; the improvement comprising a servo-control circuit responsive to the level of signals applied to said alarm control circuit for controlling the gain of said amplifying means and a timing circuit responsive to a sudden increase in signal level in said amplifying means for blocking said servo-control circuit and inhibiting the operation of said alarm control circuit for a determined time period following said sudden increase in signal level.

2. The anti-intrusion Doppler effect mini-radar of claim 1, wherein said amplifier means comprises an automatic gain controlled preamplifier connected to receive the output of said detecting and demodulating means and having a gain control terminal connected to receive the output of said servo-control circuit, and an adjustable high gain low frequency amplifier connected to receive the output of said preamplifier, and means connecting the output of said low frequency amplifier to the input of said alarm control circuit.

3. The anti-intrusion Doppler effect mini-radar of claim 2, in which said servo-control circuit has a high time constant.

4. The anti-intrusion Doppler effect mini-radar of claim 2, wherein said timing circuit has an input connected to the output of said adjustable high gain low frequency amplifier, a first output connected to block said servo-control circuit, and a second output connected to inhibit operation of said alarm control circuit.

5. The anti-intrusion Doppler effect mini-radar of claim 2, wherein said means connecting the output of said low frequency amplifier to said alarm control circuit comprises a rejection filter tuned to a frequency of any A.C. electric energy source in the vicinity of said mini-radar.

6. A doppler effect radar system comprising, means for generating and transmitting microwave energy, means for demodulating microwave energy and coupled to receive transmitted microwave energy and microwave energy reflected back to the radar system, means coupled to the output of the demodulating means for amplifying Doppler frequency shift signals appearing at said output in response to the demodulation of microwave energy reflected from objects in motion, an alarm control circuit having input means coupled to the output of the amplifying means so as to receive the amplified Doppler frequency shift signals, a servo-control circuit having a given time constant, said servo-control circuit including an input coupled to the output of said amplifying means and an output coupled to a gain control input of said amplifying means for automatically controlling the gain thereof as a function of the signal level at the output of the amplifying means, and a timing circuit responsive to a given change in the signal level in said amplifying means for deriving first and second and second control signals for respectively blocking the operation of said servo-control circuit and inhibiting the operation of said alarm control circuit for a predetermined time period following said change in signal level.

7. A radar system as claimed in claim 6 wherein the time constant of said servo-control circuit is relatively long in relation to the time period of the Doppler frequency shift signals.

8. A radar system as claimed in claim 6 further comprising a rejection filter tuned to a frequency approximately twice the frequency of the AC supply voltage at the site of the radar system and coupled between the output of the amplifying means and the input means of the alarm control circuit.

9. A radar system as claimed in claim 6 wherein said radar system is subject to undesired transient signals capable of producing false actuation of the alarm-control circuit, and said timing circuit is responsive to a transient signal and includes means for deriving said first and second control signals with a time period that is longer than the expected time period of said transient signal.

* * * * *